US011623625B2

(12) United States Patent
Nolin et al.

(10) Patent No.: US 11,623,625 B2
(45) Date of Patent: Apr. 11, 2023

(54) BRAKING SYSTEM FOR A VEHICLE HAVING HAND AND FOOT BRAKE LEVERS

(71) Applicant: BOMBARDIER RECREATIONAL PRODUCTS INC., Valcourt (CA)

(72) Inventors: Christian Nolin, St-Denis-de-Brompton (CA); Antoine Bezeau-Tremblay, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 112 days.

(21) Appl. No.: 17/110,857

(22) Filed: Dec. 3, 2020

(65) Prior Publication Data
US 2021/0086741 A1 Mar. 25, 2021

Related U.S. Application Data

(63) Continuation of application No. 16/142,507, filed on Sep. 26, 2018, now Pat. No. 10,889,278.
(Continued)

(51) Int. Cl.
B60T 13/68 (2006.01)
B60T 7/08 (2006.01)
(Continued)

(52) U.S. Cl.
CPC .............. B60T 13/686 (2013.01); B60T 7/04 (2013.01); B60T 7/08 (2013.01); B60T 8/17 (2013.01);
(Continued)

(58) Field of Classification Search
CPC ... B60T 7/04; B60T 7/042; B60T 7/08; B60T 7/085; B60T 8/17; B60T 8/176;
(Continued)

(56) References Cited

U.S. PATENT DOCUMENTS 3,610,702 A * 10/1971 MacDuff ................ B60T 8/363
303/10
3,941,429 A 3/1976 Kuwana
(Continued)

FOREIGN PATENT DOCUMENTS

DE 102010031140 A1 1/2012
EP 2868958 A1 5/2015
JP 2014148308 A 8/2014

OTHER PUBLICATIONS

Machine translation of JP2014148308A; retrieved from http://translationportal.epo.org/ on Nov. 20, 2018.
(Continued)

Primary Examiner — Kevin Hurley
Assistant Examiner — Felicia L. Brittman
(74) Attorney, Agent, or Firm — BCF LLP

(57) ABSTRACT

A vehicle has a frame, a straddle seat, front right and left wheels, a rear wheel, a steering assembly, a motor, front right and left brakes, a rear brake, and an electronic brake control unit. The electronic brake control unit has a pump, a valve box and an electronic controller. The electronic controller is electronically connected to the pump, and valves of the valve box for controlling their operation. A hand brake lever actuates a first master cylinder and thereby actuates the front brakes through the valve box. A foot brake lever actuates a second master cylinder and thereby actuates the rear brake through the valve box.

10 Claims, 12 Drawing Sheets

Related U.S. Application Data

(60) Provisional application No. 62/711,138, filed on Jul. 27, 2018, provisional application No. 62/598,797, filed on Dec. 14, 2017.

(51) Int. Cl.
| | |
|---|---|
| *B60T 8/17* | (2006.01) |
| *B62D 1/02* | (2006.01) |
| *B62D 63/04* | (2006.01) |
| *B60T 7/04* | (2006.01) |
| *B60T 13/16* | (2006.01) |
| *B60T 8/176* | (2006.01) |
| *B60T 8/1769* | (2006.01) |

(52) U.S. Cl.
CPC .............. *B60T 13/167* (2013.01); *B62D 1/02* (2013.01); *B62D 63/04* (2013.01); *B60T 8/176* (2013.01); *B60T 8/1769* (2013.01); *B60T 2270/10* (2013.01)

(58) Field of Classification Search
CPC .. B60T 8/1769; B60T 2270/10; B60T 8/3225; B60T 8/3685; B60T 13/167; B60T 13/662; B60T 13/686; B62K 5/007; B62L 3/02; B62D 1/02; B62D 63/04
USPC ........................................................ 180/400
See application file for complete search history.

(56) References Cited

U.S. PATENT DOCUMENTS

| | | |
|---|---|---|
| 4,768,843 A | 9/1988 | Baughman et al. |
| 5,634,697 A | 6/1997 | Nishii et al. |
| 6,348,352 B1 | 2/2002 | Shepard et al. |
| 6,793,295 B2 | 9/2004 | Sakamoto |
| 2002/0088661 A1 | 7/2002 | Gagnon et al. |
| 2005/0228568 A1 | 10/2005 | Hack et al. |
| 2006/0152071 A1 | 7/2006 | Takeuchi |
| 2006/0254842 A1* | 11/2006 | Dagenais ................ B62K 5/05 180/215 |
| 2008/0017459 A1 | 1/2008 | Inagaki et al. |

OTHER PUBLICATIONS

Machine translation of DE102010031140A1; retrieved from http://translationportal.epo.org/ on Nov. 20, 2018.

* cited by examiner

BRAKING SYSTEM FOR A VEHICLE HAVING HAND AND FOOT BRAKE LEVERS

CROSS-REFERENCE

The present application is a continuation of U.S. patent application Ser. No. 16/142,507, filed Sep. 26, 2018. Through U.S. patent application Ser. No. 16/142,507, the present application claims priority to U.S. Provisional Patent Application No. 62/598,797, filed Dec. 14, 2017, and U.S. Provisional Patent Application No. 62/711,138, filed Jul. 27, 2018. The entirety of these three applications is incorporated herein by reference.

TECHNOLOGICAL FIELD

The present technology relates to a braking systems for vehicles having hand and foot brake levers.

BACKGROUND

Many vehicles are now equipped with electronic brake control units that can control braking of the wheels at least partially independently of braking inputs from the driver of the vehicle. This is the case for example of vehicles equipped with an anti-lock braking system (ABS).

Many vehicles such as automobiles have a single brake lever, which is typically a foot brake lever. Therefore, the brake pressure being applied as a result of the driver actuating the foot brake lever can be known from a single pressure sensor. The electronic brake control unit can use the pressure sensed from the single pressure sensor to assist in controlling braking of all of the wheels.

Other vehicles, such as motorcycles and off-road all-terrain vehicles (ATV's), typically have a hand brake lever and a foot brake lever. In some cases, actuating either one of the brake levers results in the actuation of all of the brakes, like when using the foot brake lever in an automobile. In such cases, an electronic brake control unit using a single pressure sensor like the ones used in automobiles could be used.

In other cases, the hand lever actuates the front brakes and the foot lever actuates the rear brakes. This is sometimes referred to as a split braking system. In such cases, an electronic brake control unit using a single pressure sensor like the ones used in automobiles could not be used. Using such an electronic brake control unit in a split system would provide the braking assist functions (ABS for example) when the one of the hand brake lever and the foot brake lever with which the single pressure sensor is associated is actuated, but not when the other one of the hand brake lever and the foot brake lever is actuated.

As the single pressure sensor of automotive electronic brake control units is typically provided inside the unit, one solution could be to use two electronic brake control units, one for the hand brake lever and one for the foot brake lever. However, such a solution is costly, bulky and would result in very complex hydraulic connections between the brake levers, the brake control units and the brakes.

Thus, there is a desire for a braking system including an electronic brake control unit that can be used in a vehicle having hand and foot brake levers that form part of a split braking system.

SUMMARY

It is an object of the present technology to ameliorate at least some of the inconveniences present in the prior art.

According to an aspect of the present technology, there is provided a vehicle having a frame, a straddle seat mounted to the frame, a front right wheel operatively connected to the frame, a front left wheel operatively connected to the frame, a rear wheel operatively connected to the frame, a steering assembly operatively connected to the front left and right wheels, a motor mounted to the frame for providing power to at least one of the wheels, a front right brake operatively connected to the front right wheel for braking the front right wheel, a front left brake operatively connected to the front left wheel for braking the front left wheel, a rear brake operatively connected to the rear wheel for braking the rear wheel, and an electronic brake control unit. The electronic brake control unit has a pump, a valve box fluidly connected to the pump and an electronic controller. The valve box has a first inlet, a first outlet fluidly connected to the front right brake, a second outlet fluidly connected to the front left brake, a first valve selectively fluidly connecting the first inlet and the pump with the first outlet, a second valve selectively fluidly connecting the first inlet and the pump with the second outlet, a second inlet, a third outlet fluidly connected to the rear brake, and a third valve selectively fluidly connecting the second inlet and the pump with the third outlet. The electronic controller is electronically connected to the pump, the first valve, the second valve and the third valve for controlling operation of the pump, the first valve, the second valve and the third valve. The vehicle also has a first master cylinder fluidly connected to the first inlet, a hand brake lever operatively connected to the first master cylinder for actuating the first master cylinder and thereby actuate the front right and left brakes through the valve box, a second master cylinder fluidly connected to the second inlet, and a foot brake lever operatively connected to the second master cylinder for actuating the second master cylinder and thereby actuate the rear brake through the valve box. The electronic brake control unit selectively actuates the rear brake in response to actuation of the first master cylinder by opening the third valve and by actuating the pump. The electronic brake control unit selectively actuates the front right and left brakes in response to actuation of the second master cylinder by opening the first and second valves and by actuating the pump.

In some embodiments of the present technology, the rear wheel is a rear right wheel. The vehicle also has a rear left wheel operatively connected to the frame. The rear brake is operatively connected to the rear right and left wheels for braking the rear right and left wheels.

In some embodiments of the present technology, the rear wheel is a rear right wheel, and the rear brake is a rear right brake. The vehicle also has a rear left wheel operatively connected to the frame, and a rear left brake operatively connected to the rear left wheel for braking the rear left wheel. The valve box also has a fourth outlet fluidly connected to the rear left brake, and a fourth valve selectively fluidly connecting the second inlet and the pump with the fourth outlet. The electronic controller is electronically connected to the fourth valve for controlling operation of the fourth valve. The foot brake lever is operatively connected to the second master cylinder for actuating the second master cylinder and thereby actuate the rear right and left brakes through the valve box. The electronic brake control unit selectively actuates the rear left and right brakes in response to actuation of the first master cylinder by opening the third and fourth valves and by actuating the pump.

In some embodiments of the present technology, in response to the electronic brake control unit actuating the rear brake in response to actuation of the first master cylinder by opening the third valve and by actuating the pump: the first master cylinder applies a first front brake pressure to the front right and left brakes, and the pump applies a first rear brake pressure to the rear brake. In response to the electronic brake control unit actuating the front right and left brakes in response to actuation of the second master cylinder by opening the first and second valves and by actuating the pump: the pump applies a second front brake pressure to the front right and left brakes, and the second master cylinder applies a second rear brake pressure to the rear brake. The first front brake pressure is greater than the first rear brake pressure.

In some embodiments of the present technology, the second rear brake pressure is greater than the second front brake pressure.

In some embodiments of the present technology, wherein, for equal first front brake pressure and second rear brake pressure, the first front brake pressure is greater than the second front brake pressure.

In some embodiments of the present technology, for equal first front brake pressure and second rear brake pressure, the second rear brake pressure is greater than the first rear brake pressure.

In some embodiments of the present technology, a front-to-rear braking ratio corresponds to the first front brake pressure divided by the first rear brake pressure; a rear-to-front braking ratio correspond to the second rear brake pressure divided by the second front brake pressure; and the front-to-rear braking ratio is greater than the rear-to-front braking ratio.

In some embodiments of the present technology, a first inlet brake line fluidly connects the first master cylinder to the first inlet, a second inlet brake line fluidly connects the second master cylinder to the second inlet, a first outlet brake line fluidly connects the front right brake to the first outlet, a second outlet brake line fluidly connects the front left brake to the second outlet, and third outlet brake line fluidly connects the rear brake to the third outlet.

In some embodiments of the present technology, he electronic controller controls operation of the first valve, the second valve and the third valve by opening and closing of the first valve, the second valve and the third valve cyclically for preventing locking of the front right brake, the front left brake and the rear brake respectively.

In some embodiments of the present technology, a brake fluid reservoir is spaced from and fluidly connected to the second master cylinder.

For purposes of this application, terms related to spatial orientation such as forwardly, rearward, upwardly, downwardly, left, and right, are as they would normally be understood by a driver of the vehicle sitting thereon in a normal riding position.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Explanations and/or definitions of terms provided in the present application take precedence over explanations and/or definitions of these terms that may be found in any documents incorporated herein by reference.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
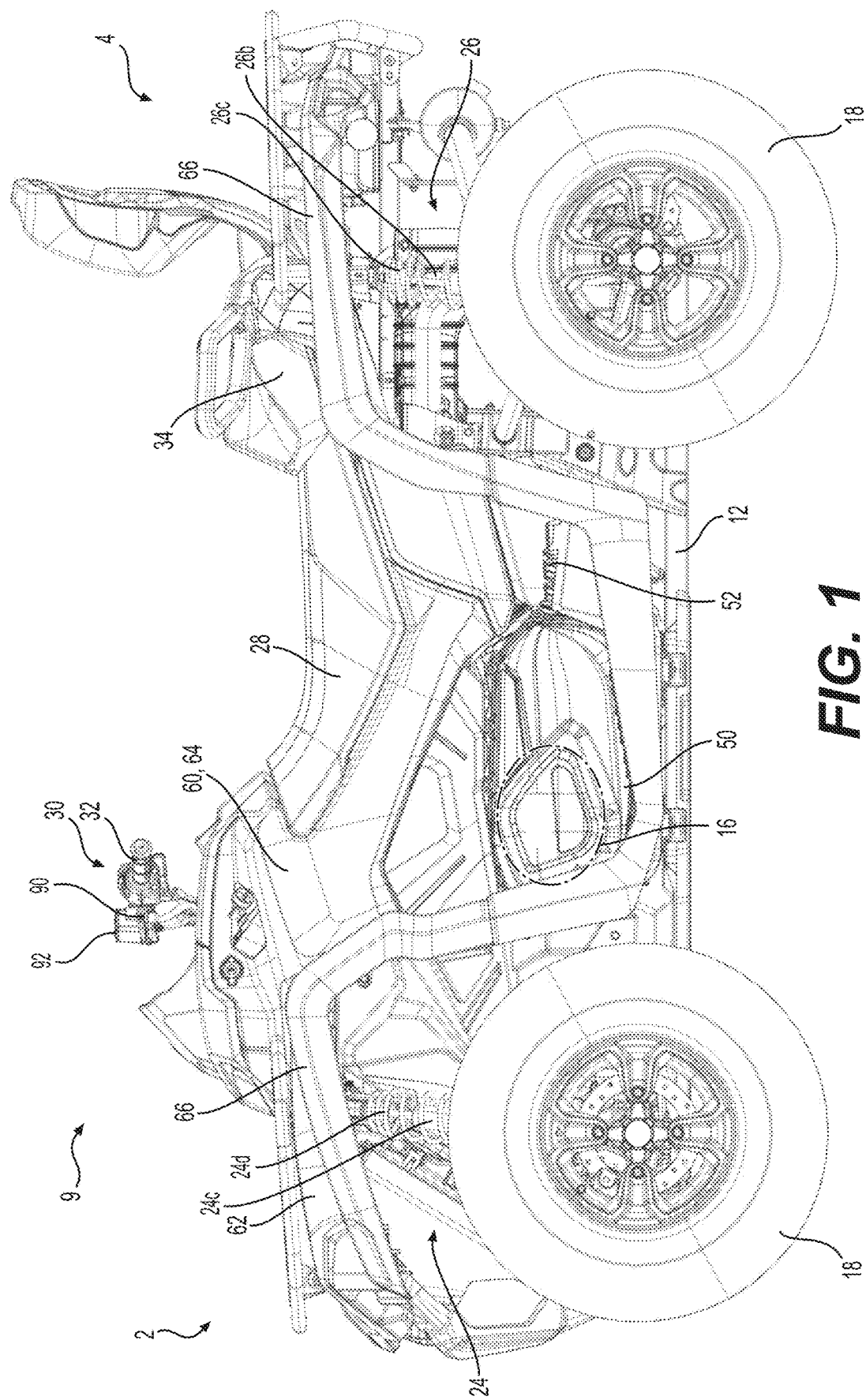
FIG. 1 is a left side elevation view of an all-terrain vehicle.
Figure 2:
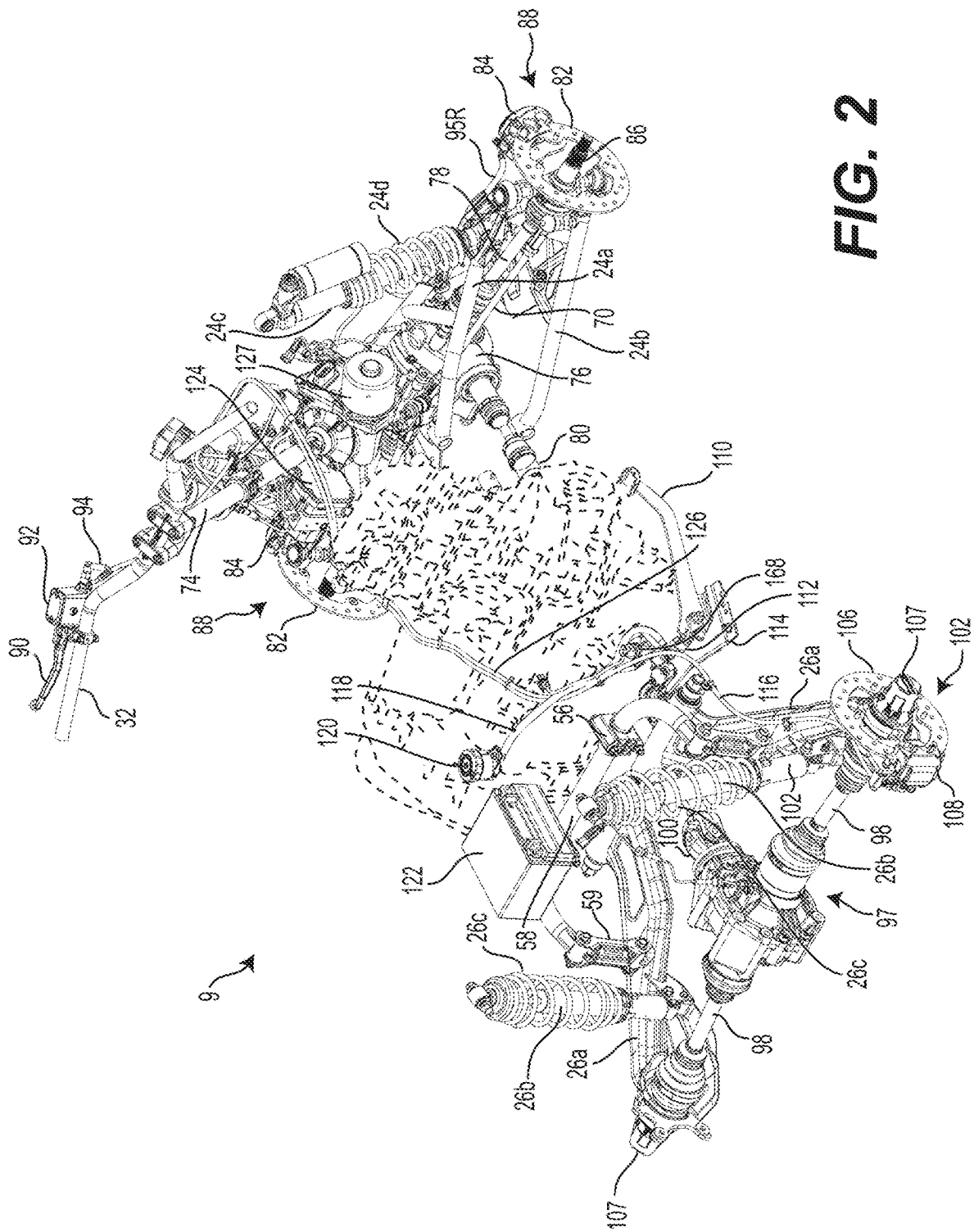
FIG. 2 is a perspective view, taken from a rear, right side, of left and right front suspensions, left and right rear suspensions, left and right front brakes, a rear brake, and steering components of the vehicle of FIG. 1.

The present technology will be described with reference to a four-wheeled straddle-seat all-terrain vehicle (ATV) 9. However, it is contemplated that aspects of the present technology could be used in other types of four-wheeled and three-wheeled vehicles having a straddle seat.

With reference to FIGS. 1 to 7, the ATV 9 has a front end 2 and a rear end 4 defined consistently with a forward travel direction of the ATV 9. The ATV 9 has a frame 12 to which is mounted an internal combustion engine 16 for powering the ATV 9. It is contemplated that the ATV 9 may be powered by other types of motors, being for example powered by an electric motor.

The ATV 9 has two front wheels 18 and two rear wheels 18. The wheels 18 are operatively connected to the engine 16 via a transmission (not shown). Each of the four wheels 18 is provided with low-pressure balloon tires adapted for off-road conditions and traversing rugged terrain.

As illustrated on FIG. 1, the ATV 9 also includes fairings 60 including a front fascia 62 at the front end 2 of the ATV 9 and several side panels 64 extending over lateral sides of the ATV 9. A fender 66 is disposed over each wheel 18 to protect the driver and/or passenger from dirt, water and other debris being projected by the rotating wheels 18. The ATV 9 further includes a straddle seat 28 mounted to the frame 12 for accommodating a driver of the ATV 9. Driver footrests 50 are provided on either of the driver seat 28 and are disposed vertically lower than the driver seat 28 to support the driver's feet. Another straddle seat 34 is provided behind the driver seat 28 to accommodate a passenger. A passenger footrest 52 is provided longitudinally rearward of each of the left and right driver footrests 50. The passenger footrests 52 are disposed slightly higher than the driver footrests 50 and are designed to accommodate the feet of a passenger seated on the passenger seat 34 which is disposed slightly vertically higher than the driver seat 28. It is contemplated that the passenger seat 34 and the passenger footrests 52 could be omitted.

The two front wheels 18 are suspended from the frame 12 by respective front suspension assemblies 24 while the two rear wheels 18 are suspended from the frame 12 by respective rear suspension assemblies 26.

Each front suspension assembly 24 includes an upper A-arm 24a, a lower A-arm 24b, a front shock absorber 24c and a front coil spring 24d. The front coil spring 24d is mounted over the front shock absorber 24c. The front coil spring 24d and the front shock absorber 24c are both pivotably connected at their lower ends to the upper A-arm 24a and at their upper ends to the frame 12. The upper and lower A-arms 24a and 24b each have their inner end pivotably connected to the frame 12. A kingpin 85 (FIG. 4) is mounted to the outer ends of the upper and lower A-arms 24a and 24b. Each front wheel 18 is rotationally connected to its corresponding kingpin 85. It is contemplated that the front suspension assemblies 24 could be of a different type.

Each rear suspension assembly 26 comprises a swing arm 26a, a rear shock absorber 26b and a rear coil spring 26c. Each swing arm 26a has one end pivotably connected to the frame 12, about a pivot axis 54 located in front of the rear wheels 18 and extending generally laterally within the frame 12, and an opposite end supporting the wheel shaft 86 of its corresponding rear wheel 18. Each swing arm 26a is connected at mid-length to a torsion bar 58 by links 59. The torsion bar 58 is mounted to the frame 12 via supports 56. For each rear suspension assembly 26, the rear shock absorber 26b and the rear coil spring 26c each have one end pivotably connected to the frame 12 and the other end pivotably connected to its corresponding swing arm 26a. It is contemplated that the rear suspension assemblies 26 could be of a different type.

A steering assembly 30 is rotationally supported by the frame 12 to enable a driver to steer the ATV 9. The steering assembly 30 includes a handlebar 32 connected to a steering column 74 for actuating steering linkages 70 operably connected to the front left and right wheels 18. A power steering electric motor 127 is mounted to the steering column 74. The power steering electric motor 127 is operatively connected to the steering column 74 and to the left and right front wheels 18 via the steering linkages 70.

The ATV 9 can be operated in rear-wheel drive mode or in four-wheel drive mode. Its front end 2 includes a front differential 76 adapted to receive, via a driveshaft 80 a torque from the engine 16. On each of its left and right sides, the front differential 76 is connected to an inner constant velocity (CV) joint (not shown) connected to one end of a respective half shaft 78. Outer CV joints (not shown) are connected to the outer ends of both half shaft 78. A wheel shaft 86 passing through and supported by its corresponding kingpin 85 is connected to its corresponding outer CV joint. A front wheel 18 and a front brake disc 82 are mounted to each wheel shaft 86. Depending on riding conditions of the ATV 9, the front differential 76 may send unequal torque to the two front wheels 18 so that the front left wheel 18 and the front right wheel 18 may rotate at different speeds.

Front left and right brakes 88 each include a corresponding one of the brake discs 82 and each further include a caliper 84 mounted on the corresponding kingpin 85. The front left and right calipers 84 are respectively connected to outlet brake lines 95L and 95R. Each caliper 84 includes a pair of brake pads positioned on opposite sides of its respective brake disc 82. The front brakes 88 are actuated by actuating the calipers 84 by application of a fluid pressure in the outlet brake lines 95L and 95R, thereby causing the brake pads to apply pressure on their respective brake discs 82.

The ATV 9 includes a rear spool gear (not shown) enclosed within a housing 97. An input shaft 100 of the spool gear 96 is operably connected to a shaft 101 by a universal joint 99. The shaft 101 is connected by a universal joint 103 to the transmission to receive an input torque from the engine 16. On each of its left and right sides, the spool gear 96 is connected to an inner CV joint (not shown) connected to an inner end of a respective half shaft 98. An outer CV joint (not shown) is connected to an outer end of each half shaft 98. Two wheel shaft 104 pass through and are supported by the lower ends of the swing arms 26a and are connected to the outer CV joints. The rear wheels 18 are mounted to the two wheel shaft 104. The spool gear transmits the torque received from the engine 16 to the rear left and right wheels 18 via the inner CV joints, the half shafts 98, the outer CV joints and the wheel shafts 104 such that the rear left and right wheels 18 rotate together at the same speed.

The ATV 9 has a single rear brake 102. The rear brake 102 includes a single brake disc 106 and a single caliper 108. The brake disc 106 is mounted to a wheel hub 107 that is mounted on the rear right wheel shaft 104. Although the single rear brake 102 is located on the right-hand side of the ATV 9, mounting the single rear brake 102 on the left-hand side of the ATV 9 is also contemplated. The single caliper 108 is supported by the right swing arm 26a. The single caliper 108 is connected to an outlet brake line 116. The single caliper 108 includes a pair of brake pads (not shown) positioned on opposite sides of the brake disc 106. The rear brake 102 is actuated by actuating the caliper 108 by application of a fluid pressure in the outlet brake line 116, thereby causing the brake pads to apply pressure on the brake disc 106. The rear brake 102 thus brakes both rear wheels 18.

Figure 8:
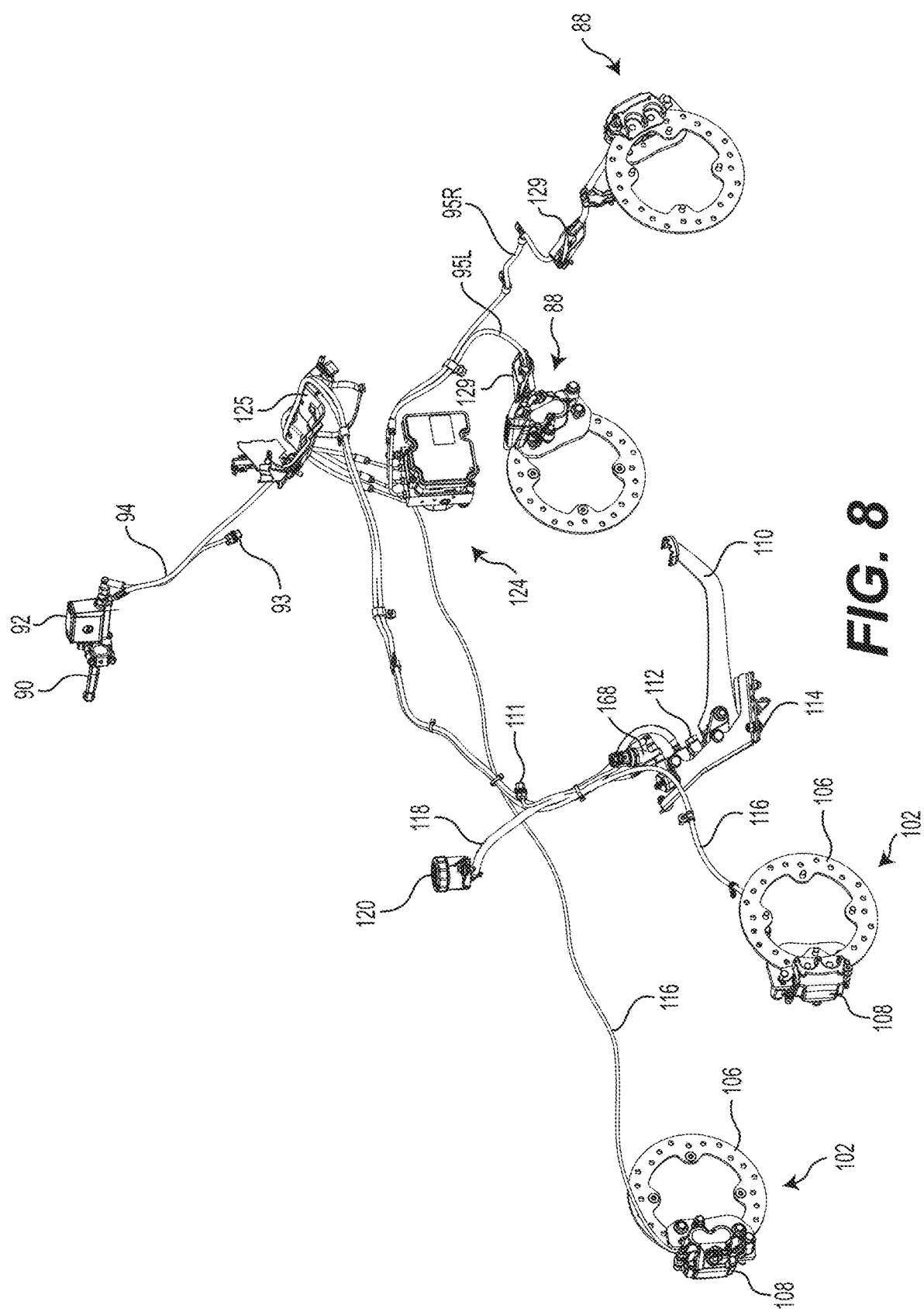
FIG. 8 is a perspective view taken from a rear, right side of an alternative embodiment of an ABS assembly of the vehicle of FIG. 1.

In an alternative embodiment illustrated in FIG. 8, the ATV 9 has rear left and right brakes 102. Both rear brakes have the same construction as the rear brake 102 described above, and as such will not be described again in detail. In this embodiment, the spool gear is replaced by a rear differential thereby allowing the rear left and right wheels 18 to turn at different speeds and allowing each rear brake 102 to brake its corresponding rear wheel 18.

The ATV has a hand brake lever 90 connected to a front master cylinder 92 used to actuate the front left and right brakes 88. The hand lever 90 and the front master cylinder 92 are mounted on the left side of the handlebar 32. The front master cylinder 92 can be directly filled with brake fluid, but it is contemplated that the front master cylinder 92 could be provided with a separate brake fluid reservoir. Actuating the hand brake lever 90 causes the front master cylinder 92 to transmit a brake pressure to an electronic brake control unit 124 via an inlet brake line 94 and from the electronic brake control 124 to the brakes 88 via the outlet brake lines 95L, 95R as will be described in more detail below. When the hand brake lever 90 is actuated, a signal is sent via a connector 93 for turning on brake lights (not shown).

The ATV also has a foot brake lever 110 connected to a rear master cylinder 112. The foot brake lever 110 and the rear master cylinder 112 are mounted on a bracket 114 supported by the lower portion of the frame 12. The foot brake lever 110 is on a right side of the straddle seat 28. The rear master cylinder 112 receives brake fluid via a hose 118 from a brake fluid reservoir 120. As can be seen in the Figures, the brake fluid reservoir 120 is spaced from the rear master cylinder 122. More specifically, the brake fluid reservoir 120 is vertically higher than the rear master cylinder 112. Actuating the foot brake lever 110 causes the rear master cylinder 112 to transmit a brake pressure to the electronic brake control unit 124 via an inlet brake line 126 and from the electronic brake control 124 to the rear brake 102 via the outlet brake line 116 as will be described in more detail below. In the embodiment of FIG. 8, actuating the foot brake lever 110 causes the rear master cylinder 112 to transmit a brake pressure to the electronic brake control unit 124 via the inlet brake line 126 and from the electronic brake control 124 to the rear left and right brakes 102 via the outlet brake lines 116. When the foot brake lever 110 is actuated, a signal for turning on the brake lights is sent via a connector 111.

A bracket 125 mounted near the steering column 74 and the braking control unit 124 supports the various brake lines 94, 116 and 126. Two brackets 129 mounted to the upper A-arms 24a (see FIG. 4) support the left and right outlet brake lines 95L, 95R.

Figure 10:
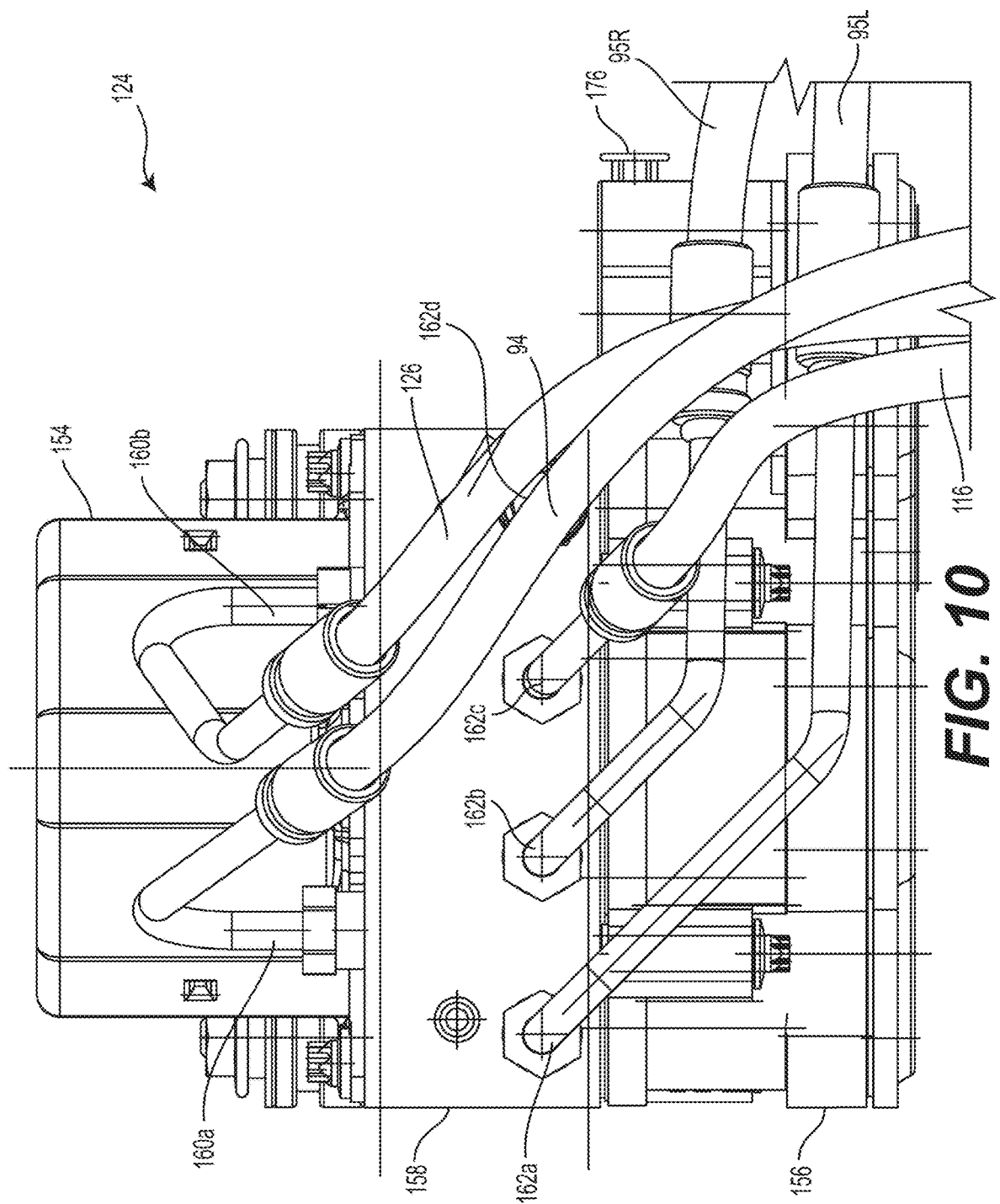
FIG. 10 is a close-up top view of the electronic brake control unit of the ABS assembly of FIG. 6.

As best seen in FIG. 10, the electronic brake control unit 124 includes a pump 154, an electronic controller 156 and a valve box 158. The electronic controller 156 and the pump 154 are energized by a battery 122 mounted above the input shaft 100, the shaft 101 and the universal joint 99. The battery 122 also energizes other electrical components of the ATV 9.

Figure 3:
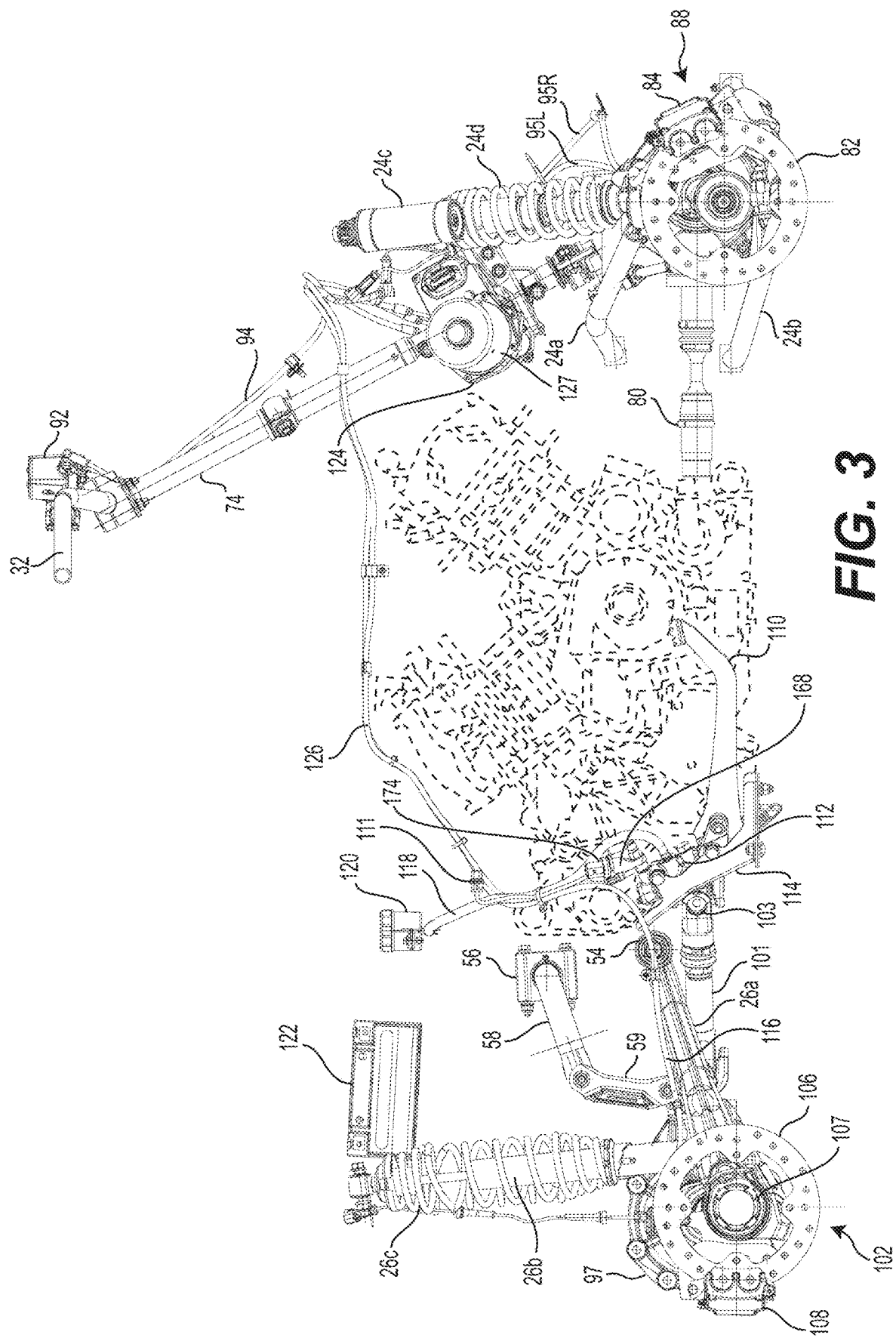
FIG. 3 is a right side elevation view of the components of FIG. 2.
Figure 4:
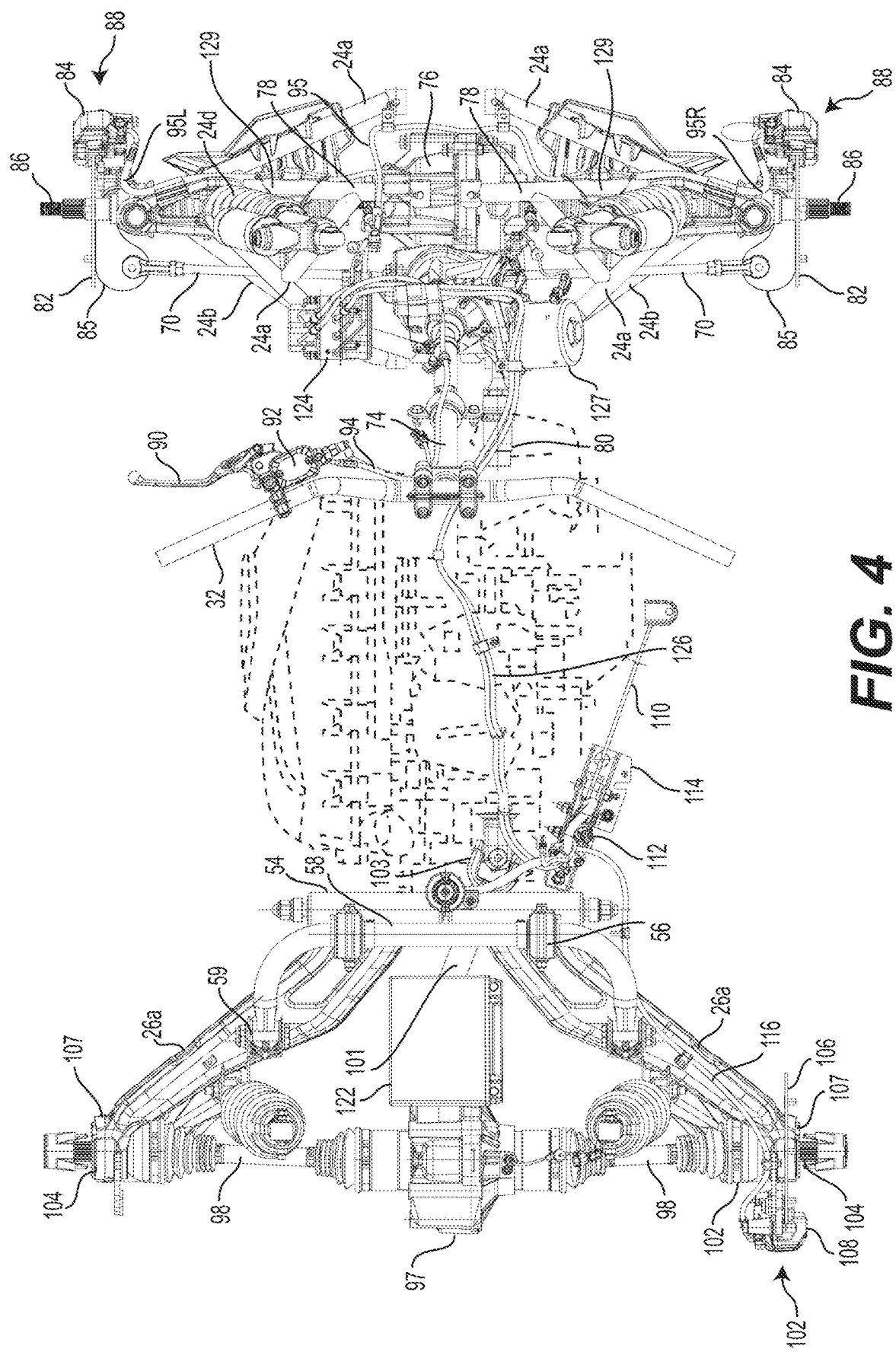
FIG. 4 is a top plan view of the components of FIG. 2.
Figure 5:
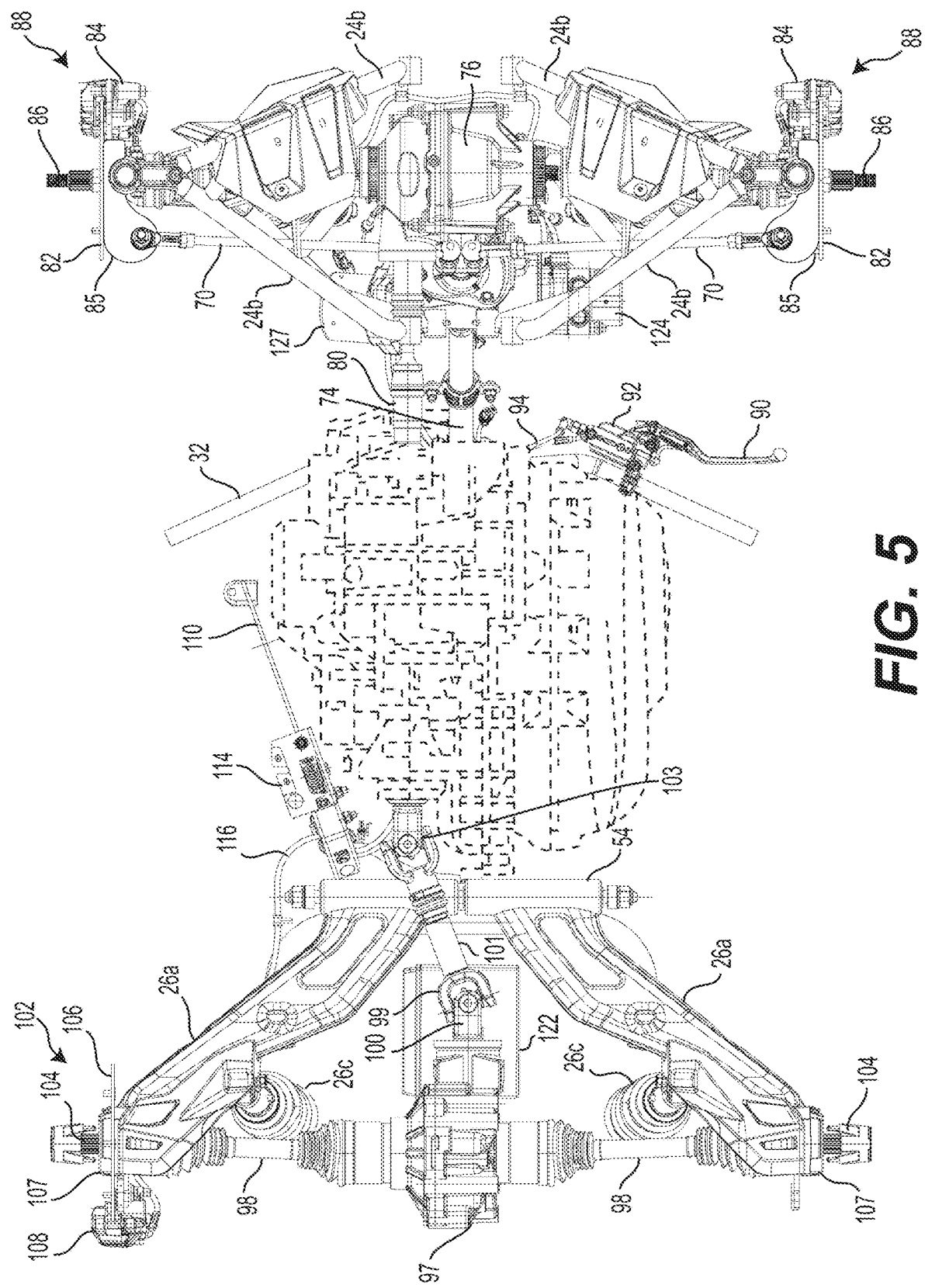
FIG. 5 is a bottom plan view of the components of FIG. 2.
Figure 6:
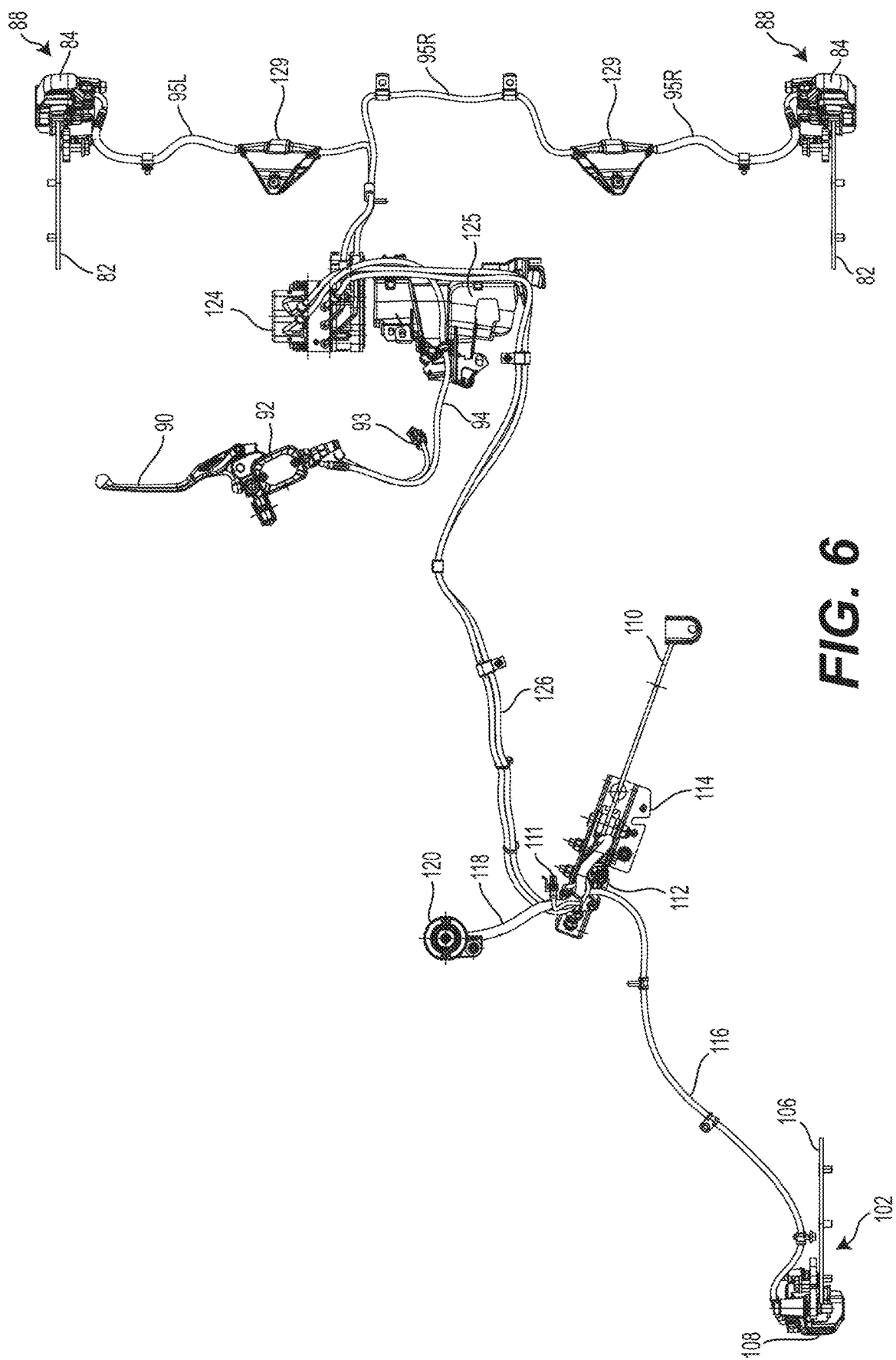
FIG. 6 is a top plan view of an anti-lock braking system (ABS) assembly of the vehicle of FIG. 1.
Figure 7:
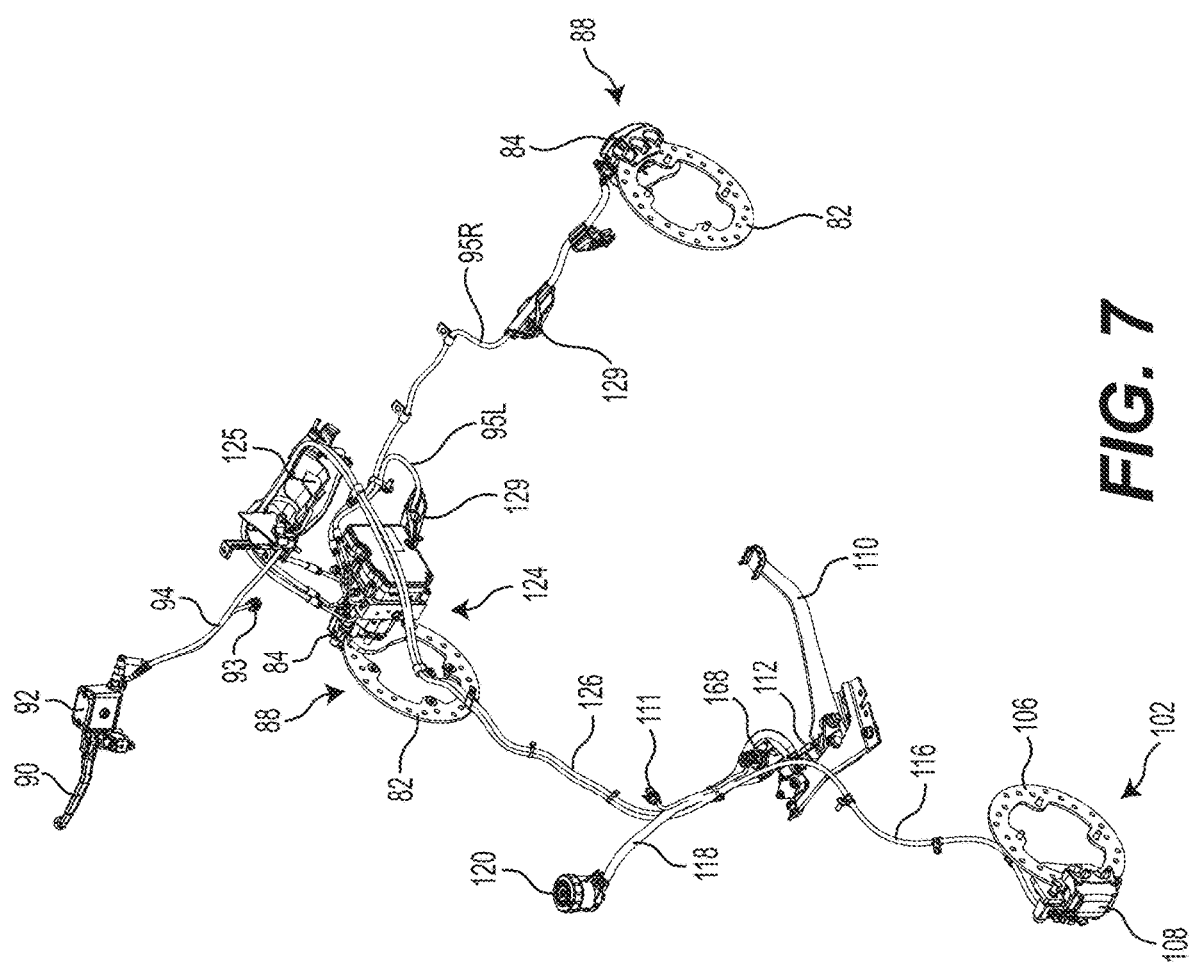
FIG. 7 is a perspective view taken from a rear, right side of the ABS assembly of FIG. 6.

In the present embodiment, the power steering electric motor 127 and the braking control unit 124 are mounted proximate to one another so that the pump 154 and the power steering electric motor 127 overlap at least partially in a vertical direction when viewed from a side of the ATV 9 (i.e. as seen in FIG. 3).

The ATV 9 includes other components such as a throttle operator, a gear shifter, an air intake system, an exhaust system, radiators, headlights, and the like. As it is believed that these components would be readily recognized by one of ordinary skill in the art, further explanation and description of these components will not be provided herein.

Turning now to FIGS. 6, 9, 10 and 11, the braking system assembly of the ATV 9 will be described in more detail. The braking system assembly includes the aforementioned brakes 88, 102, hand and foot brake levers 90, 110, front and rear master cylinders 92, 112, brake fluid reservoir 120, hose 118, brake lines 94, 95L, 95R, 116, 126 and braking control unit 124. The braking system assembly also includes additional components described below. The braking system of the braking system assembly of the present embodiment is an anti-lock braking system (ABS) designed to help prevent the wheels 18 from locking when braking as will be described below.

With reference to FIG. 10, it can be seen that the valve box 158 of the electronic brake control unit 124 is disposed laterally between the pump 154 and the electronic controller 156, with the pump 154 being disposed on the left side of the valve box 58. It is contemplated that the electronic brake control unit 124 could be oriented differently than illustrated in the Figures.

The valve box 158 defines two inlets 160a, 160b on a left side thereof and four outlets 162a, 162b, 162c, 162d on a top thereof. It is contemplated that the inlets 160a, 160b and outlets 162a, 162b, 162c, 162d could be defined elsewhere on the valve box 158. With reference to FIG. 10, the inlet 160a is fluidly connected to the front master cylinder 92 by the inlet brake line 94. The inlet 160b is fluidly connected to the rear master cylinder 112 by the inlet brake line 126. The outlet 162a is fluidly connected to the caliper 84 of the front left brake 88 by the outlet brake line 95L. The outlet 162b is fluidly connected to the caliper 84 of the front right brake 88 by the outlet brake line 95R. The outlet 162c is fluidly connected to the caliper 108 of the rear brake 102 by the outlet brake line 116. In the present embodiment, the outlet 162d is plugged because it is not used, and as such it is contemplated that the outlet 162d could be omitted.

Figure 11:
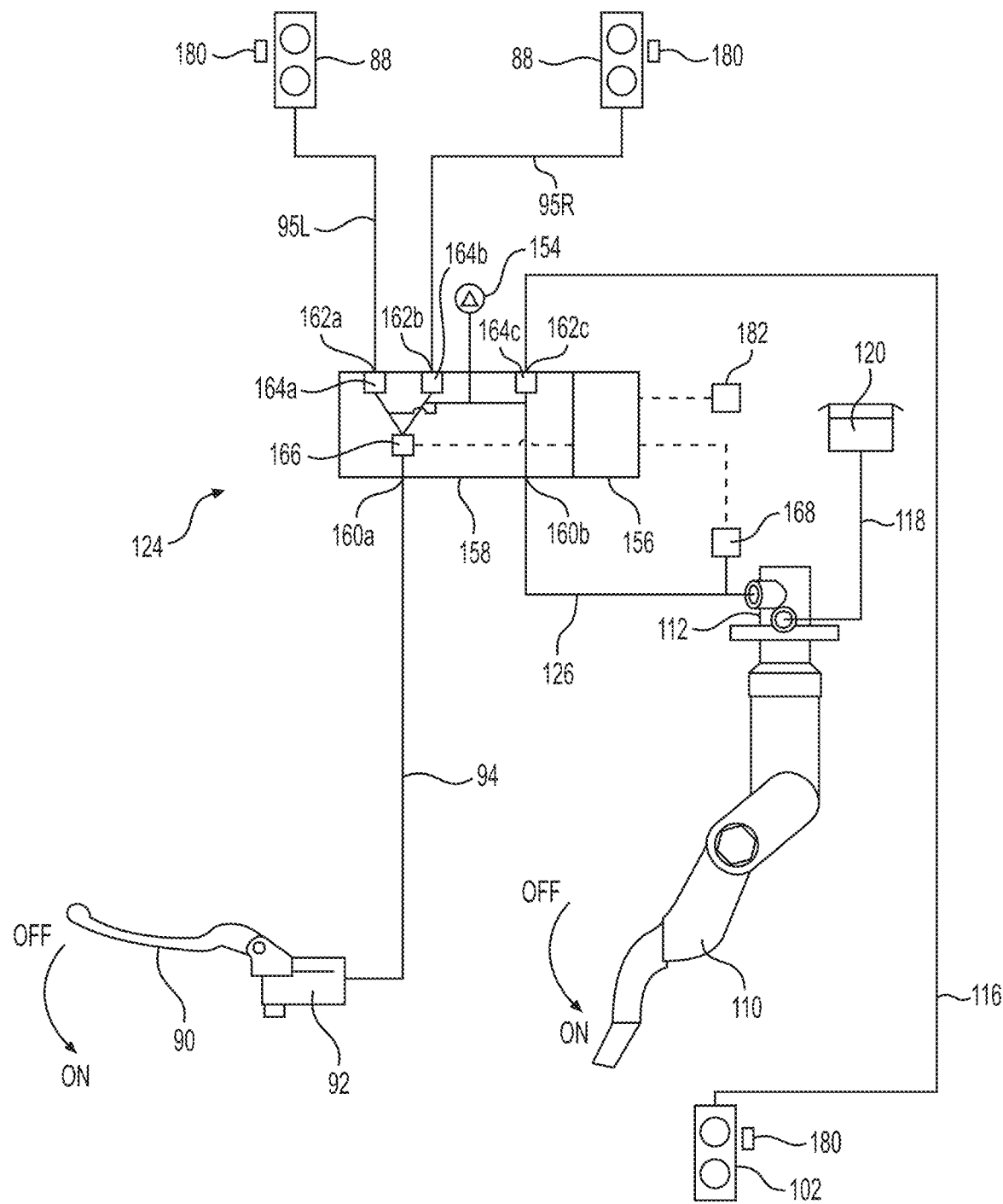
FIG. 11 a schematic representation of the ABS assembly of FIG. 6.

As can be seen in FIG. 11, the inlet 160a fluidly communicates with the outlets 162a, 162b and that the inlet 160b fluidly communicates with the outlet 162c inside the valve box 158. As its name suggests, the valve box 158 contains a number of valves 164a, 164b and 164c. The valve 164a selectively opens and closes the outlet 162a and therefore selectively communicates the inlet 160a with the outlet 162a. The valve 164b selectively opens and closes the outlet 162b and therefore selectively communicates the inlet 160a with the outlet 162b. The valve 164c selectively opens and closes the outlet 162c and therefore selectively communicates the inlet 160b with the outlet 162c. The valves 164a, 164b, 164c are electronically connected to the electronic controller 156 which controls their operation as will be described below.

The pump 154 is electronically connected to the electronic controller 156 which controls its operation as will be described below. The pump 154, as can be seen in FIG. 11, is fluidly connected between the inlet 160a and the valve 164a, between the inlet 160a and the valve 164b, and between the inlet 160b and the valve 164c. The valves 164a, 164b, 164c thus selectively fluidly communicate the pump 154 with the outlets 162a, 162b, 162c respectively. As such, by actuating the pump 154 and opening the corresponding valve 164a, 164b, 164c, the electronic controller 158 can actuate a corresponding one of the brakes 88, 102 completely independently or at least partially independently of the actuation of the hand and foot brake levers 90, 110.

As can also be seen in FIG. 11, a front pressure sensor 166 is disposed in the valve box 158. The front pressure sensor 166 senses the fluid pressure of the brake fluid between the inlet 160a and the valves 164a, 164b. The front pressure sensor 166 is electronically connected to the electronic controller 158 to send a signal representative of the pressure it senses to the electronic controller 158.

Figure 9:
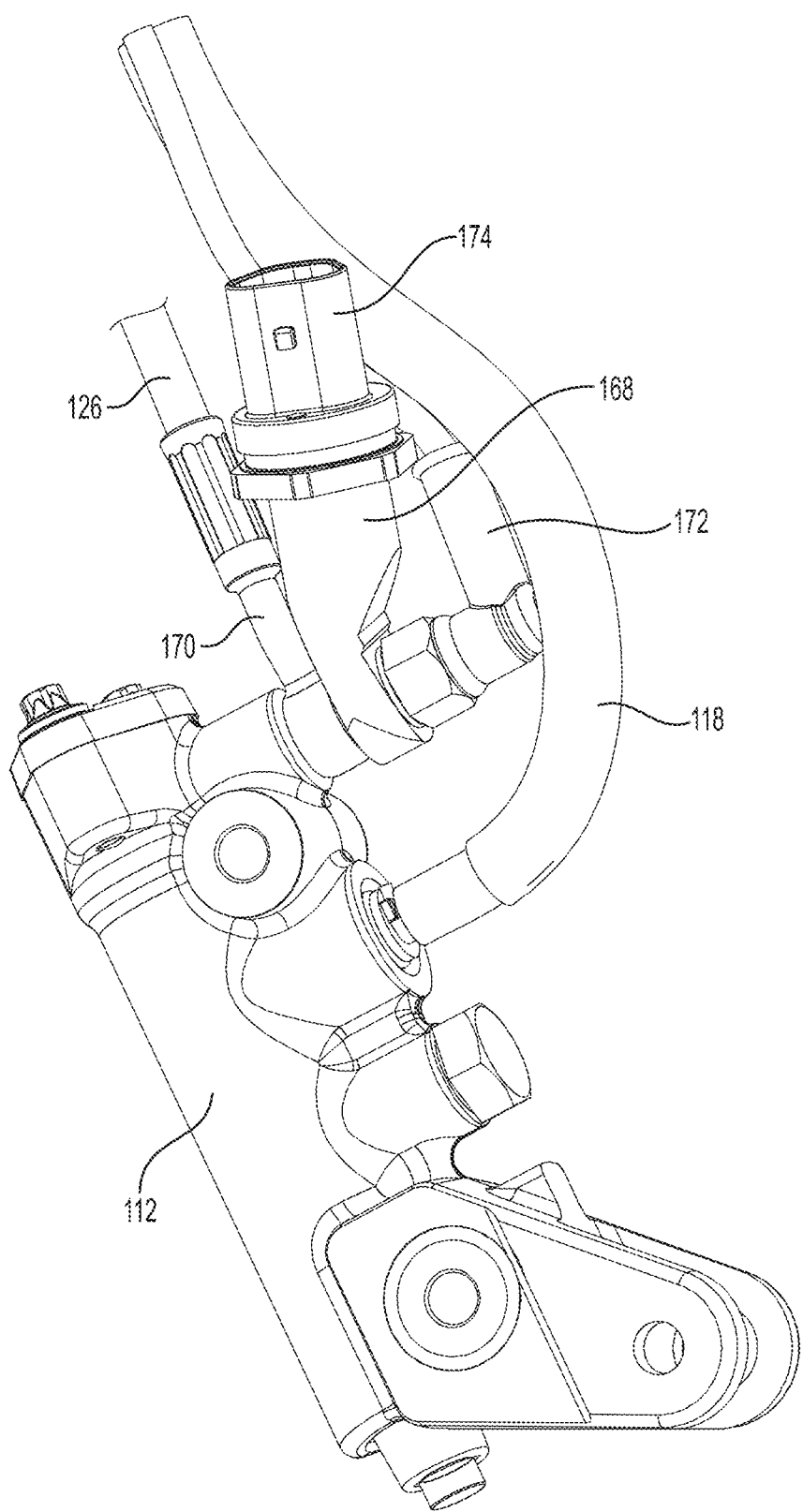
FIG. 9 is a right side view of a pressure sensor and a master cylinder of the foot brake lever of the ABS assembly of FIG. 6.

As can be seen in FIG. 11, there is no pressure sensor inside the valve box 158 between the inlet 160b and the valve 164c. Instead of being inside the box 158, a rear pressure sensor 168 is provided externally of the valve box 158. The rear pressure sensor 168 senses the fluid pressure of the brake fluid between the rear master cylinder 112 the valve 164c. The rear pressure sensor 168 is electronically connected to the electronic controller 158 to send a signal representative of the pressure it senses to the electronic controller 158. As best seen in FIG. 9, the rear pressure sensor 168 is mounted to the rear master cylinder 112. More specifically, the rear pressure sensor 168 is disposed between a fluid connector 170, and a connector 172, and the pressure sensor 168, and connectors 170, 172 are connected together to an outlet of the rear master cylinder 112. The fluid connector 170 is disposed between the rear pressure sensor 168 and the rear master cylinder 112. The fluid connector 170 connects the inlet brake line 126 to the rear master cylinder 112. The connector 172 connects the connector 111 to the rear master cylinder 112. The rear pressure sensor 168 has a port 174 used to electronically connect the rear pressure sensor 168 to a port 176 (FIG. 10) of the electronic controller 156. As best seen in FIG. 3, the rear pressure sensor 168 is vertically higher than the foot brake lever 110. Mounting the rear pressure sensor 168 to the rear master cylinder 112 as described about provides a rigid connection of the rear pressure sensor 168, thereby improving its readings, avoids the need of a split in the inlet brake line 126 which would otherwise be needed to install the rear pressure sensor 168, provides a location permitting easy installation and removal compared to the front pressure sensor 166, and provides a location that is relatively isolated from the elements by being shielded by the right side panel 64 of the ATV 9. It is however contemplated that the rear pressure sensor 168 could be provided elsewhere on the ATV 9 to sense pressure inside the inlet brake line 126 anywhere between the rear master cylinder 112.

In the present embodiment, the driver of the ATV 9 can actuate the hand brake lever 90 or the foot brake lever 110 individually and the electronic brake control unit 124 will cause all three brakes 88, 102 to brake regardless of which brake lever 90, 110 is actuated as described below.

When the driver actuates the hand brake lever 90, the front master cylinder 92 transmits a first front brake pressure to the inlet 160a which is sensed by the front pressure sensor 166. The valves 162a, 162b are opened and the first front brake pressure is applied to the front left and right brakes 88, thereby actuating the front brakes 88. Only when the signal received by the electronic controller 156 from the front pressure sensor 166 indicates a pressure that exceeds a first pressure threshold, the electronic controller 156 opens the valve 162c and actuates the pump 154 to apply a first rear brake pressure to the rear brake 102, thereby actuating the rear brake 102. In some embodiments, the first pressure threshold is less than 0.5 psi. In the present embodiment, the first pressure threshold is 0 psi, such that the valve 162c is opened and the pump 154 is actuated as soon as an increase in pressure is sensed by the front pressure sensor 166. The first front brake pressure applied by the front master cylinder 92 to the front brakes 88 is greater than the first rear brake pressure applied by the pump to the rear brake 102. The ratio corresponding to the first front brake pressure divided by the first rear brake pressure is known as the front-to-rear braking ratio, and this ratio is greater than one (1.0) in response to the actuation of the hand brake lever 90.

When the driver actuates the foot brake lever 110, the rear master cylinder 112 transmits a second rear brake pressure to the inlet 160b which is sensed by the rear pressure sensor 168. The valve 162c is opened and the second rear brake pressure is applied to the rear brake 102, thereby actuating the rear brake 102. Only when the signal received by the electronic controller 156 from the rear pressure sensor 168 indicates a pressure that exceeds a second pressure threshold, the electronic controller 156 opens the valves 162a, 162b and actuates the pump 154 to apply a second front brake pressure to the front brakes 88, thereby actuating the front brakes 108. In the present embodiments, the second pressure threshold is less than 5 psi, but other values are contemplated. The second pressure threshold (i.e. 5 psi) is greater than the first pressure threshold described above (i.e. less than 0.5 psi or 0 psi) because the rear pressure sensor 168 is more likely to generate a noisy signal than the front pressure sensor 166 that is in the valve box 158. Therefore, the higher pressure threshold helps ensure that the pressure signal sent by the rear pressure sensor 168 is indicative of a pressure resulting of actuation of the rear master cylinder 112 by the foot brake lever 110 and is not the result of a noisy signal. The second rear brake pressure applied by the rear master cylinder 112 to the rear brake 102 is greater than the second front brake pressure applied by the pump to the front brakes 88. The ratio corresponding to the second rear brake pressure divided by the second front brake pressure is known as the rear-to-front braking ratio, and this ratio is greater than one (1.0) in response to the actuation of the foot brake lever 110.

In the present embodiment, the front-to-rear braking ratio is greater than the rear-to-front braking ratio. Also, when comparing a first scenario where the master cylinder 92 applies the first front brake pressure to the front brakes 88 and the pump 154 applies the first rear brake pressure to the rear brake 102 to a second scenario where the master cylinder 112 applies the second rear brake pressure to the rear brake 102 and the pump 154 applies the second front brake pressure to the front brakes 88, and where the first front brake pressure is equal to the second rear brake pressure (i.e. the brake pressures applied by the master cylinders 92, 112 in both scenarios are the same), the first front brake pressure is greater than the second front brake pressure; the second rear brake pressure is greater than the first rear brake pressure; and the second front rear brake pressure is greater than the first rear brake pressure. As such for equal amounts of brake pressure applied by the master cylinders 92, 112, the pump will apply more brake pressure when the foot brake lever 110 is actuated than when the hand brake lever 90 is actuated.

Although the driver of the ATV 9 may actuate the hand brake lever 90 and the foot brake lever 110 individually, the driver may sometimes actuate both brake levers 90, 110 at the same time. In such a scenario, should the rear brake pressure applied to the rear brake 102 by the rear master cylinder 112 be less than would have be applied by the pump 154 had only the hand brake lever 90 been actuated such that the front master cylinder 92 would be applying the same front brake pressure, then the electronic controller 156 actuates the pump 154 to boost the rear brake pressure. Similarly, should the front brake pressure applied to the front brakes 88 by the front master cylinder 92 be less than would have been applied by the pump 154 had only the foot brake lever 100 been actuated such that the rear master cylinder 112 would be applying the same rear brake pressure, then the electronic controller 156 actuates the pump 154 to boost the front brake pressure.

Under some operating conditions, the electronic brake control unit 124 may control the pump 154 and/or the valves 164a, 164b, 164c to: apply more or less rear brake pressure to the rear brake 102 then described above when the hand brake lever 90 is actuated; apply more or less front brake pressure to the front brakes 88 then described above when the foot brake lever 110 is actuated; boost the front brake pressure applied to the front brakes 88 by the front master cylinder 92 when the hand brake lever 90 is actuated; boost the rear brake pressure applied to the rear brake 102 by the rear master cylinder 112 when the foot brake lever 110 is actuated; apply different front brake pressures to the two front brakes 88; and apply a brake pressure to one or more of the brakes 88, 102 even when none of the brake levers 90, 110 is actuated. A non-limiting example is provided further below.

The operation of the ABS will now be described. During operation, the ABS uses wheel speed signals received by the electronic controller 156 from three wheel speed sensors 180 (schematically illustrated in FIG. 11) that detect the speed of rotations of the three wheels 18. The electronic controller 156 detects the onset of locking (or actual locking) of one of the front left and right brakes 88, or the onset of locking (or actual locking) of the rear brake 102, when one of the wheel speed sensors 180 reports a significantly lower wheel speed than the other speed sensors 180. When this happens, the electronic controller 156 causes the valve 164a, 164b, 164c connected to the brake 88 or 102 that is locked or about to become locked to modulate the pressure applied by the corresponding caliper 84 or 108 on the disc 82 or 106, by repeatedly closing and opening the valve 164a, 164b or 164c to repeatedly reduce or release and then re-apply brake pressure in the corresponding brake line 95L, 95R or 116 until the wheel 18 connected to the brake 88 or 102 that was locked or about to become locked rotates again at about the same speed as the other wheels 18. As such, the electronic controller 156 controls operation of the valves 164a, 164b and 164c by opening and closing them cyclically for preventing locking of the front right brake 88, the front left brake 88 and the rear brake 102 respectively. It is contemplated that this control could be applied to two or all of the brakes 88, 102 at the same time.

It is also contemplated that, in the four-wheel drive mode, the electronic controller 156 may detect a loss of traction of one of the front wheels 18. In such a scenario, one of the two front speed sensors 180 reports a significantly higher speed than the other one of the two front speed sensors 180 when the corresponding front left or right wheel 18 is slipping. In response, the electronic controller 156 may cause brake pressure to be applied to the brake 88 that corresponds to the slipping front wheel 18 by opening the corresponding valve 164a or 164b and actuating the pump 154. This action causes the front differential 76 to transfer torque to the slower one of the front wheels 18. As in the case of ABS operation, the electronic controller 156 may modulate the brake pressure applied to the brake 88 of the slipping front wheel 18, by repeatedly closing and opening the valve 164a or 164b to repeatedly reduce or release and then re-apply brake pressure in the corresponding brake line 95L, 95R until the front wheel 18 that was slipping gains traction and starts rotating again at about the same speed as the other front wheel 18.

It is contemplate that the electronic control unit 124 could also use inputs from one or more operating condition sensors, such as the vehicle acceleration sensor 182 schematically shown in FIG. 11, for sensing one or more corresponding operating conditions of the ATV 9. The one or more operating condition sensors are electronically connected to the electronic controller 156 for sending one or more corresponding operating condition signals to the electronic controller 156.

Figure 12:
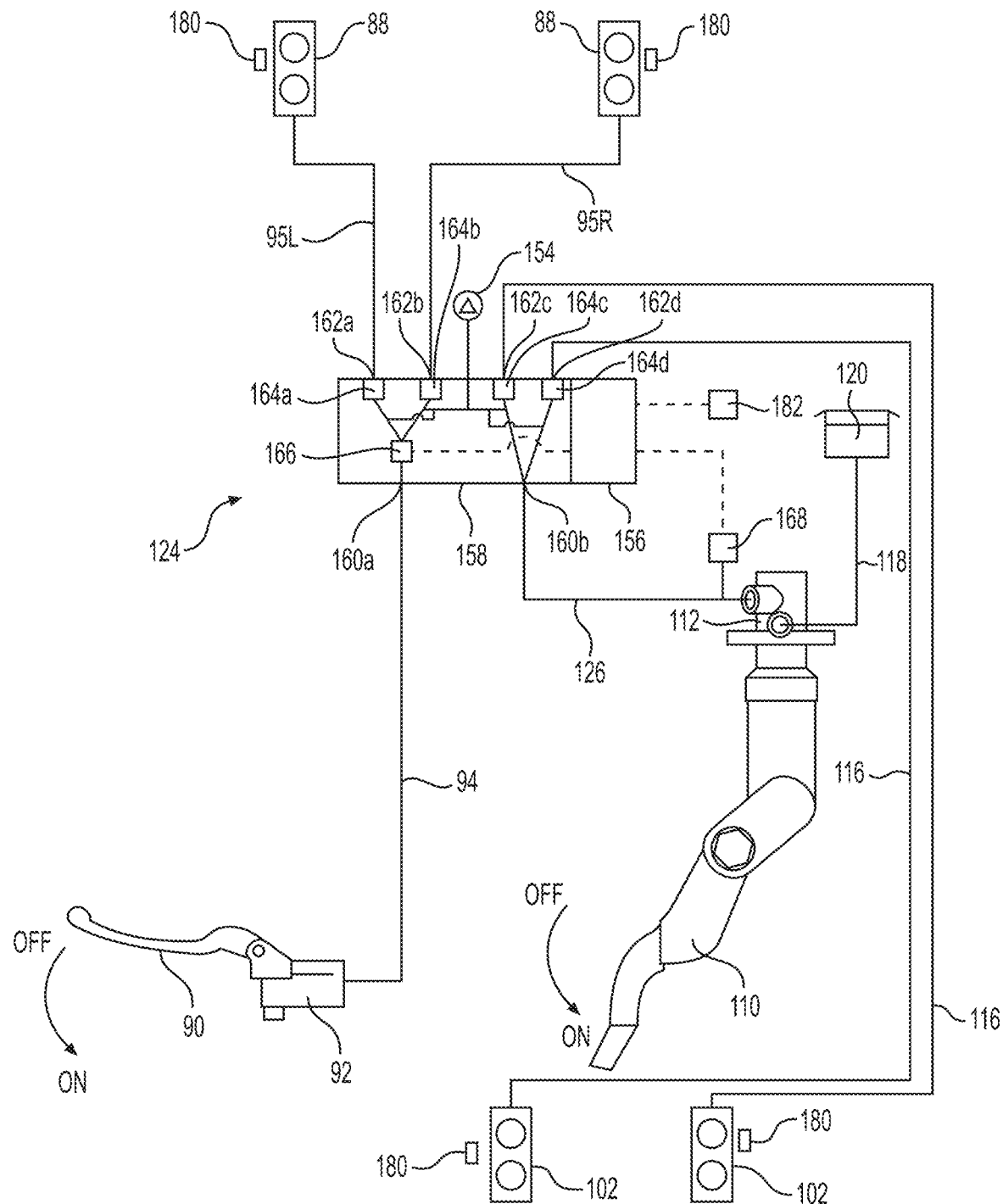
FIG. 12 a schematic representation of the ABS assembly of FIG. 8.

FIG. 12 schematically represent the ABS assembly of the embodiment of FIG. 8. The ABS assembly of FIG. 12 is the same as the one illustrated in FIG. 11 except that a valve 164d for opening and closing the outlet 162d and wheel speed sensor 180 have been added. The valve 164d and the wheel speed sensor are electronically connected to the electronic controller 156. The electronic controller 156 controls the opening and closing of the valve 164d to control the brake pressure applied to the rear left brake 102 in the same way as the valve 164c is controlled to control the brake pressure applied to the rear right brake 102. In addition, since in the embodiment of FIG. 8 the rear wheels 18 can rotate at different speeds, slipping of the rear wheels can be controlled using the valves 164c, 164d and the pump 154 in the same way as described above to control slipping of the front wheels 18 using the valves 164a, 164b and the pump 154.

It is contemplated that the above described braking assemblies could be used with electronic brake control units that provide braking systems that provide braking functions other than or in addition to those of an ABS.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame;
   a straddle seat mounted to the frame;
   a front right wheel operatively connected to the frame;
   a front left wheel operatively connected to the frame;
   a rear wheel operatively connected to the frame;
   a steering assembly operatively connected to the front left and right wheels;
   a motor mounted to the frame for providing power to at least one of the wheels;
   a front right brake operatively connected to the front right wheel for braking the front right wheel;
   a front left brake operatively connected to the front left wheel for braking the front left wheel;
   a rear brake operatively connected to the rear wheel for braking the rear wheel;
   an electronic brake control unit comprising:
      a pump;
      a valve box fluidly connected to the pump, the valve box comprising:
         a first inlet;
         a first outlet fluidly connected to the front right brake;
         a second outlet fluidly connected to the front left brake;
         a first valve selectively fluidly connecting the first inlet and the pump with the first outlet;
         a second valve selectively fluidly connecting the first inlet and the pump with the second outlet;
         a second inlet;
         a third outlet fluidly connected to the rear brake; and
         a third valve selectively fluidly connecting the second inlet and the pump with the third outlet; and
      an electronic controller electronically connected to the pump, the first valve, the second valve and the third valve for controlling operation of the pump, the first valve, the second valve and the third valve;
   a first master cylinder fluidly connected to the first inlet;
   a hand brake lever operatively connected to the first master cylinder for actuating the first master cylinder and thereby actuate the front right and left brakes through the valve box;
   a second master cylinder fluidly connected to the second inlet; and
   a foot brake lever operatively connected to the second master cylinder for actuating the second master cylinder and thereby actuate the rear brake through the valve box,
   the electronic brake control unit selectively actuating the rear brake in response to actuation of the first master cylinder by opening the third valve and by actuating the pump,
   the electronic brake control unit selectively actuating the front right and left brakes in response to actuation of the second master cylinder by opening the first and second valves and by actuating the pump, in response to the electronic brake control unit actuating the rear brake in response to actuation of the first master cylinder by opening the third valve and by actuating the pump:
   the first master cylinder applying a first front brake pressure to the front right and left brakes; and
   the pump applying a first rear brake pressure to the rear brake;
in response to the electronic brake control unit actuating the front right and left brakes in response to actuation of the second master cylinder by opening the first and second valves and by actuating the pump:
   the pump applying a second front brake pressure to the front right and left brakes; and
   the second master cylinder applying a second rear brake pressure to the rear brake; and
the first front brake pressure is greater than the first rear brake pressure.

2. The vehicle of claim 1, wherein:
the rear wheel is a rear right wheel;
the vehicle further comprises a rear left wheel operatively connected to the frame; and
the rear brake is operatively connected to the rear right and left wheels for braking the rear right and left wheels.

3. The vehicle of claim 1, wherein:
the rear wheel is a rear right wheel; and
the rear brake is a rear right brake;
the vehicle further comprises:
   a rear left wheel operatively connected to the frame; and
   a rear left brake operatively connected to the rear left wheel for braking the rear left wheel;
the valve box further comprises:
   a fourth outlet fluidly connected to the rear left brake; and
   a fourth valve selectively fluidly connecting the second inlet and the pump with the fourth outlet; and
wherein:
   the electronic controller is electronically connected to the fourth valve for controlling operation of the fourth valve;
   the foot brake lever is operatively connected to the second master cylinder for actuating the second master cylinder and thereby actuate the rear right and left brakes through the valve box; and
   the electronic brake control unit selectively actuates the rear left and right brakes in response to actuation of the first master cylinder by opening the third and fourth valves and by actuating the pump.

4. The vehicle of claim 1, wherein the second rear brake pressure is greater than the second front brake pressure.

5. The vehicle of claim 1, wherein, for equal first front brake pressure and second rear brake pressure, the first front brake pressure is greater than the second front brake pressure.

6. The vehicle of claim 1, wherein, for equal first front brake pressure and second rear brake pressure, the second rear brake pressure is greater than the first rear brake pressure.

7. The vehicle of claim 1, wherein:
a front-to-rear braking ratio corresponds to the first front brake pressure divided by the first rear brake pressure;
a rear-to-front braking ratio corresponds to the second rear brake pressure divided by the second front brake pressure; and
the front-to-rear braking ratio is greater than the rear-to-front braking ratio.

8. The vehicle of claim 1, further comprising:
a first inlet brake line fluidly connecting the first master cylinder to the first inlet;
a second inlet brake line fluidly connecting the second master cylinder to the second inlet;
a first outlet brake line fluidly connecting the front right brake to the first outlet;
a second outlet brake line fluidly connecting the front left brake to the second outlet; and
a third outlet brake line fluidly connecting the rear brake to the third outlet.

9. The vehicle of claim 1, wherein the electronic controller controls operation of the first valve, the second valve and the third valve by opening and closing of the first valve, the second valve and the third valve cyclically for preventing locking of the front right brake, the front left brake and the rear brake respectively.

10. The vehicle of claim 1, further comprising a brake fluid reservoir spaced from and fluidly connected to the second master cylinder.

* * * * *

UNITED STATES PATENT AND TRADEMARK OFFICE
CERTIFICATE OF CORRECTION

PATENT NO. : 11,623,625 B2
APPLICATION NO. : 17/110857
DATED : April 11, 2023
INVENTOR(S) : Christian Nolin et al.

It is certified that error appears in the above-identified patent and that said Letters Patent is hereby corrected as shown below:

On the Title Page

Item (56) - References Cited, should include the US PATENT DOCUMENT --8,348,352 B2 1/2013 Nishimo et al.--

Signed and Sealed this
Second Day of January, 2024

Katherine Kelly Vidal
*Director of the United States Patent and Trademark Office*